Aug. 14, 1945.   W. R. CALVERT ET AL   2,382,381
GAS TESTING METHOD AND APPARATUS
Filed April 10, 1941
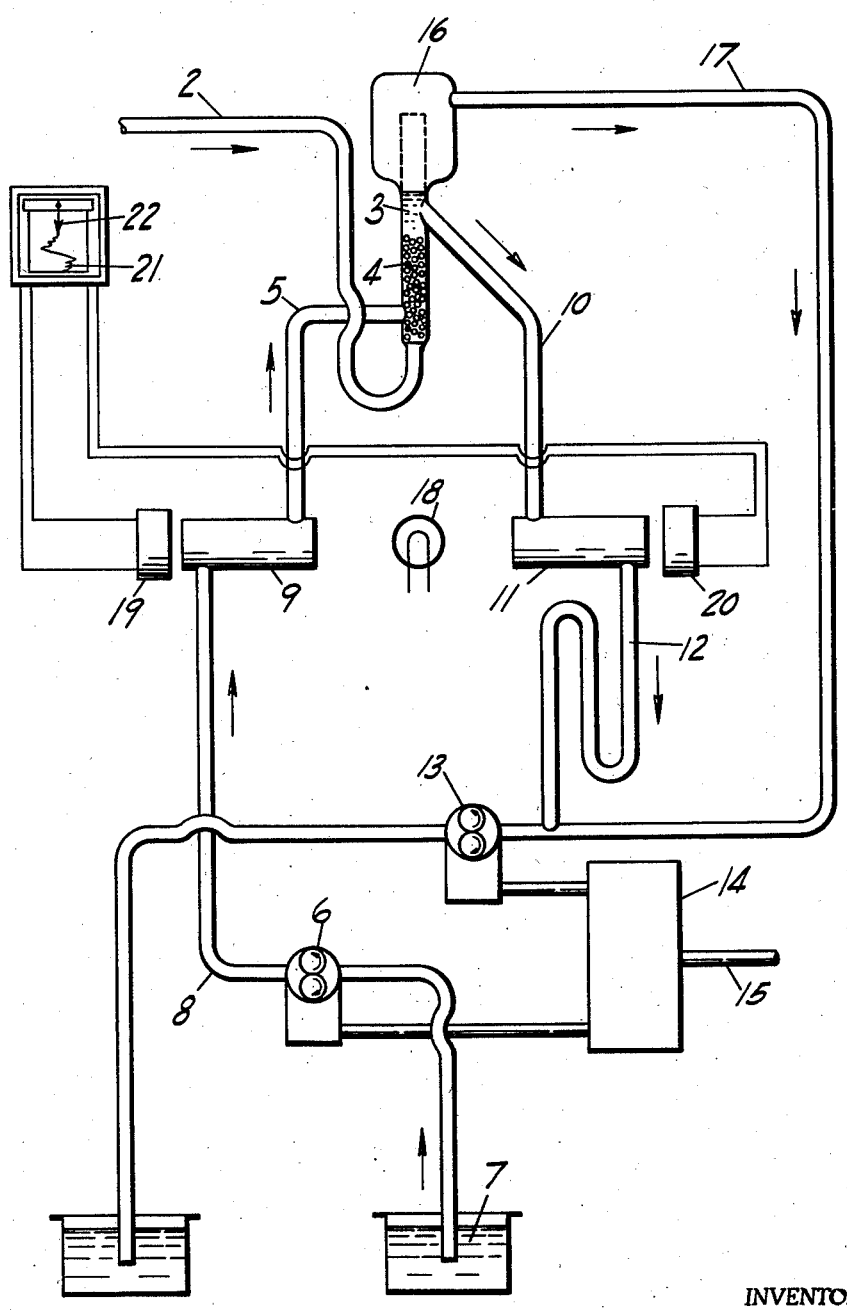
INVENTORS.
WILLARD RIGG CALVERT.
BEN ELWOOD WHITE.
BY Thomas R. O'Malley
ATTORNEY.

Patented Aug. 14, 1945

2,382,381

UNITED STATES PATENT OFFICE 2,382,381

GAS TESTING METHOD AND APPARATUS

Willard Rigg Calvert, Burnham, and Ben Elwood White, Lewistown, Pa., assignors to American Viscose Corporation, Wilmington, Del., a corporation of Delaware Application April 10, 1941, Serial No. 387,896

8 Claims. (Cl. 23—232)

This invention relates to a method and apparatus for determining and recording the proportions of a constituent of a gaseous or vaporous medium.

It is an object of the invention to provide a method of continuously sampling the gaseous or vaporous medium to be tested and of continuously absorbing the constituent of the gas or vapor to be determined directly in a continuous stream of a liquid reagent, the color or shade of which is affected by that constituent and of maintaining constant the ratio of the volume of the gas sample to the volume of the liquid reagent into which it flows.

A further object of the invention is to compensate for fluctuation in the light transmission characteristics of the unaffected reagent and for the fluctuation of the light emitted by the light source employed in making the determinations.

A further object of the invention is the provision of a novel arrangement of apparatus for carrying out the method.

Other objects and advantages of the invention will be apparent from the description which follows.

The single figure of the drawing is a diagrammatic view illustrative of the invention.

While the invention will be described with particular reference to the determination of carbon disulfide in gases or vapors, it is equally adaptable to the determination of other constituents of a gas or vapor, as will be more particularly pointed out hereinafter.

Referring to the figure of the drawing, there is shown a sampling tube 2 adapted to be connected to the supply of, or atmosphere constituting, the gas to be tested. For example, it may be desired to test the air for the presence of carbon disulfide. This tube 2 leads the gas to be tested to the bottom of an absorption cell 3 which may contain packing elements 4 of chemically inert materials, such as glass rings, etc. to assist in mixing the gas with the liquid reactant supplied to the bottom of the absorption cell 3 by the tube 5. A pump 6 of suitable character adapted to deliver a constant volume of fluid, such as a gear pump, is connected at its intake side to a reservoir 7 of liquid reactant comprising a solution of cupric acetate and diethylamine in methyl cellosolve (ethylene glycol monomethyl ether), and discharges at a constant rate into a tube 8 leading to a comparison tube 9 which is connected by means of the tube 5 to the bottom of the absorption cell 3. The absorption cell 3 is provided with a side-arm outlet 10 at the top of the portion in which absorption of the gas to be tested occurs in the liquid reactant. This side-arm 10 leads to a second comparison tube 11 which is connected through a liquid trap 12 to the intake side of a second pump 13 which is operated to deliver at a constant rate bearing a constant predetermined relationship to the rate of discharge of the first pump 6. The constant ratio between the delivery rates of the two pumps is maintained by the positive interconnections therebetween including the reduction gear 14. The drive shaft 15 may be driven by any suitable motor not shown, preferably a constant speed motor.

The top of the absorption cell is provided with a dome 16 into which it opens. The dome 16 which serves to collect or receive the unabsorbed portion of the gas stream is provided with a tube 17 connected to the intake side of the second pump 13.

As shown in the figure, the two comparison tubes 9 and 11 are in alignment end to end and a light source 18 is provided between their adjacent ends. Photocells 19 and 20 are provided one at each of the extreme ends of the comparison tubes 9 and 11 so as to receive the light transmitted from the light source 18 through the comparison tubes. The photocells are arranged in an electric circuit, such as in a Wheatstone bridge type of circuit, in such a manner that they balance each other when the reactant is unaffected by the gas passed therethrough. An automatic recorder 21 is connected in the circuit so that the movement of its stylus 22 is controlled by the difference between the light transmitted through the unaffected reactant and that transmitted through the reactant after passage of the gas to be tested therethrough.

As an example of a more specific adaptation of the foregoing procedure to the determination of carbon disulfide in air, two gear pumps each having an 0.6 cc. rating were employed, one operated at a speed of 384 R. P. M. for pumping the gas and the other at 1.92 R. P. M. for pumping the liquid reactant. A 6-volt lamp drawing current from any suitable source of electric power served as a light source; the comparison tubes were of glass and had a capacity of 5 cc.; the absorption cell had a capacity of 5 cc.; two Weston photronic cells, each with a Viscor filter, served to detect the light transmitted; and a Leeds and Northrup Micromax recorder was employed. In the liquid reactant, other soluble copper salts, such as cupric sulfate, may be employed, and nonaqueous solvents other than methyl cellosolve may be used.

The apparatus is so arranged that the gas to be tested is directly absorbed by the reactant in the absorber 3 without the necessity of first absorbing the constituent of the gas to be determined in a separate volume of a liquid, such as water or other solvent, and then subjecting the reactant to the liquid containing the absorbed constituent, thereby simplifying the apparatus and obtaining such economies as are associated therewith.

By employing a single motor and a positive driving arrangement between the motor and the two constant volume pumps 6 and 13, a constant ratio between the volumes delivered by the two pumps is maintained regardless of any fluctuation in the motor speed and consequently no inaccuracy other than a change of time lag between sampling and recording results from such fluctuation. The sensitivity of the analysis may be readily controlled by adjusting the ratio between the speeds of the pumps. For example, where an atmosphere is to be tested which contains a very minute amount of the constituent to be determined, a ratio should be selected so that a greater volume of gas may be passed through a given volume of liquid reactant.

As shown in the figure, the reactant after absorption and after flowing through the comparison tube 11 is led to the intake side of the gas pump 13 and serves to lubricate it. This arrangement is such that the single pump 13 not only serves to draw the gas sample through the absorption chamber, but also maintains a continuous and uniform flow of the reagent from the absorption chamber through the second color chamber.

The arrangement of the two comparison tubes 9 and 11 is such that one contains the reactant before absorption of the gas while the other contains the reactant after absorption. By arranging the photocells 19 and 20 in a Wheatstone bridge type of circuit, any fluctuation in the light emitted from the light source and any fluctuation of the light absorption characteristics of the original reactant is automatically nullified in the recorded results.

The various tubes may be made of any suitable material inert to the reactant and the gas to be tested, it being essential however that the ends of the comparison tubes be transparent to that portion of the radiant energy emitted by the light source, the absorption of which by the reactant is dependent upon the extent to which the reactant is affected by the constituent of the gas to be determined. In the example above where carbon disulfide was determined, visible light was employed. However, ultraviolet or infra-red or any selected band of radiant energy may be employed, care being taken to employ comparison tubes having ends capable of transmitting the particular band of radiant energy employed. In such cases also, a light source emitting the desired radiant energy and photocells or other light-response devices sensitive to the desired radiant energy should be employed.

Should the atmosphere or other gas being tested contain small amounts of other gases or vapors which would interfere with the determination of the particular constituent, the gas sample may be drawn through preliminary absorption cells to remove the interfering constituents. For example, when testing for carbon disulfide, any hydrogen sulfide present in the gas to be tested may be absorbed by drawing the gas sample through an absorbing liquid containing an alkaline cadmium chloride before it is led to the cell where it is absorbed by the liquid reactant.

The method and apparatus described herein may be employed for detecting and recording the quantity of other gaseous or vaporous constituents of a gaseous or vaporous medium, such as carbon monoxide, carbon dioxide, hydrogen sulfide, oxygen, methane, etc. For each particular gas, the proper specific liquid reactant should be employed so that changes of color or shade therein are dependent upon the amount of the particular gaseous constituent to be determined.

While a preferred embodiment of the invention has been shown and described, it is to be understood that changes and variations may be made therein without departing from the spirit and scope of the invention as defined by the appended claims.

What we claim is:

1. In a method of determining the proportion in which a constituent of a gas or vapor of variable constitution is present therein during an interval of time, the steps of continuously withdrawing from said gas or vapor throughout said interval a stream thereof, continuously passing through a common path and in intimate contact said stream and a stream of liquid containing a reactant substantially uniformly dispersed therein which affects the radiant energy transmission of said liquid upon contact with said constituent, then separating the unabsorbed portion of the gas stream from the liquid stream, ascertaining the change in the radiant energy transmission characteristics of the separated liquid stream as compared to the liquid stream prior to intermingling with the gas or vapor stream in the common path, again combining the separated liquid stream with the unabsorbed portion of the gas stream, discharging the combined stream, and maintaining a substantially constant ratio between the volumetric rate of such discharge and the rate of supply of the reactant-containing liquid stream to the common path.

2. In a method of determining the proportion in which a constituent of a gas or vapor of variable constitution is present therein during an interval of time, the steps of continuously withdrawing from said gas or vapor throughout said interval a stream constituting a continuous sampling of said gas or vapor, continuously passing through a common path and in intimate contact said stream and a stream of liquid containing a reactant substantially uniformly dispersed therein which affects the radiant energy transmission of said liquid upon contact with said constituent, supplying the liquid stream to the common path at a substantially constant volumetric rate through a path leading thereto separate from that of the gas stream proceeding thereto, separating the unabsorbed portion of the gas stream from the liquid stream, ascertaining the change in the radiant energy transmission characteristics of the separated liquid stream as compared to the liquid stream prior to intermingling with the gas or vapor stream in the common path, again combining the separated liquid stream with the unabsorbed portion of the gas stream, and discharging the combined stream at a volumetric rate bearing a substantially constant ratio to that of the rate of supply of the reactant-containing liquid stream to the common path.

3. In a method of determining the proportion in which a constituent of a gas or vapor of variable constitution is present therein during an interval of time, the steps of continuously withdrawing from said gas or vapor throughout said interval a stream constituting a continuous sampling of said gas or vapor, continuously passing through a common path and in intimate contact said stream and a stream of liquid containing a reactant substantially uniformly dispersed therein which affects the radiant energy transmission of said liquid upon contact with said constituent, supplying the liquid stream to the common path at a substantially constant volumetric rate through a path leading thereto separate from that of the gas stream proceeding thereto, separating the unabsorbed portion of the gas stream from the liquid stream, continuously ascertaining the difference in radiant energy transmission characteristics of two substantially equal-length portions in the path of said liquid stream one flowing to and the other flowing from the point of passing the gas or vapor stream therethrough in the common path, again combining the separated liquid stream with the unabsorbed portion of the gas stream, and discharging the combined stream at a volumetric rate bearing a substantially constant ratio to that of the rate of supply of the reactant-containing liquid stream to the common path.

4. In a method of determining the proportion in which carbon disulfide is present in a gaseous or vaporous medium during an interval of time, the steps of continuously withdrawing from said gas or vapor throughout said interval a stream constituting a continuous sampling of said gas or vapor, continuously passing through a common path and in intimate contact said stream and a stream of a solution of a copper salt and diethylamine, supplying the solution to the common path at a substantially constant predetermined rate through a path leading thereto separate from that of the gas stream proceeding thereto, separating the unabsorbed portion of the gas stream from the stream of solution, ascertaining the change in the light transmission characteristics of a portion of the separated liquid stream as compared to the liquid stream prior to intermingling with the gas or vapor stream in the common path, again combining the separated liquid stream with the unabsorbed portion of the gas stream, and discharging the combined stream at a volumetric rate bearing a substantially constant ratio to that of the rate of supply of the reactant-containing liquid stream to the common path.

5. In an apparatus for determining the proportion in which a constituent of a gas or vapor of a variable constitution is present therein during an interval of time, an absorption chamber, means comprising a pump and a pipe for introducing a liquid into the chamber at a substantially predetermined volumetric rate, a liquid outlet arranged to discharge liquid from the chamber when its level is above a predetermined height in the chamber, a conduit for introducing gas or vapor arranged with its discharge opening near the bottom of the chamber, a second pump, a conduit connecting the upper portion of the chamber above the liquid outlet to the suction side of the second pump, another conduit connecting the liquid outlet of the chamber to the suction side of the second pump, means operatively connecting the pumps for maintaining a substantially constant ratio between the volumetric rate of discharge of the second pump and the volumetric rate of delivery by the first pump for introducing liquid into the chamber, and means associated with the conduit connected to the liquid outlet of the chamber and located between the chamber and the second pump for ascertaining a physical characteristic of the liquid therein.

6. In an apparatus for determining the proportion in which a constituent of a gas or vapor of a variable constitution is present therein during an interval of time, an absorption chamber, means comprising a pump and a pipe for introducing a liquid into the chamber at a substantially predetermined volumetric rate, a liquid outlet arranged to discharge liquid from the chamber when its level is above a predetermined height in the chamber, a conduit for introducing gas or vapor arranged with its discharge opening near the bottom of the chamber, a second pump, a conduit connecting the upper portion of the chamber above the liquid outlet to the suction side of the second pump, another conduit connecting the liquid outlet of the chamber to the suction side of the second pump, means operatively connecting the pumps for maintaining a substantially constant ratio between the volumetric rate of discharge of the second pump and the volumetric rate of delivery by the first pump for introducing liquid into the chamber, and means associated with the pipe for introducing liquid into the chamber and with the conduit connected to the liquid outlet of the chamber, and located between the chamber and the pumps, for detecting and indicating the difference in a selected physical characteristic of the liquids in said pipe and conduit.

7. In an apparatus for determining the proportion in which a constituent of a gas or vapor of a variable constitution is present therein during an interval of time, an absorption chamber, means comprising a pump and a pipe for introducing a liquid into the chamber at a substantially predetermined volumetric rate, a liquid outlet arranged to discharge liquid from the chamber when its level is above a predetermined height in the chamber, a conduit for introducing gas or vapor arranged with its discharge opening near the bottom of the chamber, a second pump, a conduit connecting the upper portion of the chamber above the liquid outlet to the suction side of the second pump, another conduit connecting the liquid outlet of the chamber to the suction side of the second pump, means operatively connecting the pumps, for maintaining a substantially constant ratio between the volumetric rate of discharge of the second pump and the volumetric rate of delivery by the first pump for introducing liquid into the chamber, and means associated with the pipe for introducing liquid into the chamber and with the conduit connected to the liquid outlet of the chamber, and located between the chamber and the pumps, for detecting and indicating the difference in light transmission characteristics of the liquids in said pipe and conduit.

8. In an apparatus for determining the proportion in which a constituent of a gas or vapor of a variable constitution is present therein during an interval of time; a light source; a pair of chambers having substantially equal-lengths symmetrically arranged with respect to the light source to transmit light therefrom; an absorption chamber having an effective absorption portion connected to each of said pair of chambers by separate conduits and having a gas collecting portion above the effective absorption portion;

means comprising a pump and a conduit to one of said pair of chambers for passing a liquid containing a reactant which affects the light transmission of said liquid upon contact with said constituent in sequential order through that one of said pair of chambers and said absorption chamber; means comprising a gas or vapor supply conduit to the effective absorption portion of the absorption chamber, a second pump, a second gas or vapor conduit connecting the gas-collecting portion of the absorption chamber to the second pump, and a liquid overflow conduit connecting the effective absorption portion of the absorption chamber to the second pump for drawing at least a portion of said gas or vapor through said liquid reactant in said absorption chamber; means operatively connecting the pumps for maintaining constant the ratio between the speed of said two pumps whereby a constant ratio exists between the volume of said gas or vapor and that of said liquid; and light responsive means adjacent each of said pair of chambers for detecting and indicating the difference in light transmission characteristics between the liquids contained in said pair of chambers.

WILLARD RIGG CALVERT.
BEN ELWOOD WHITE.